Jan. 5, 1965

A. L. KAUFMAN 3,164,717

HEATING CONTROL DEVICE

Filed Oct. 23, 1962

INVENTOR.
ARTHUR L. KAUFMAN
BY
Ward, Neal, Haselton, Orme & McEchannon
ATTORNEYS Jan. 5, 1965 A. L. KAUFMAN 3,164,717
HEATING CONTROL DEVICE
Filed Oct. 23, 1962 2 Sheets-Sheet 2

INVENTOR.
ARTHUR L. KAUFMAN
BY
Ward, Neal, Haselton, Orme & McElhannon
ATTORNEYS

United States Patent Office 3,164,717
Patented Jan. 5, 1965

3,164,717
HEATING CONTROL DEVICE
Arthur L. Kaufman, Westport, Conn., assignor to Bohn Business Machines, Inc., New York, N.Y., a corporation of New York
Filed Oct. 23, 1962, Ser. No. 232,554
4 Claims. (Cl. 219—388)

This invention relates to sheet stock heating devices and more particularly it concerns a fail-safe heating system for use in photographic and related work.

This application is a continuation-in-part of my copending application Serial No. 86,113, filed January 31, 1961, now abandoned, which in turn is a continuation-in-part of my further copending application Serial No. 4,737, filed January 26, 1960, now Patent No. 3,146,100, issued August 24, 1964.

In many photocopying and related operations, a sheet of material, such as paper or Celluloid, is continuously withdrawn from a feed roll and is passed through a number of successive processing steps. Very often one or more of these steps requires the application of heat to the sheet material. For example, in a photocopying apparatus of the type shown and described in the above-mentioned applications a reproduced image, in the form of resin deposits electrostatically held against a paper sheet, is "fixed" or permanently bonded to the sheet by a controlled heating which fuses the resin into a solid, fully cured thermoset state, adherently bonded to the sheet. The heating step is accomplished by the provision of a heating element such as an electrical resistance or a lamp, directed toward a given point across which the sheet moves. The sheet thus receives radiant heat from the element in an amount depending upon its rate of movement and upon the temperature of the element.

The amount of heat required in the carrying of these various processing steps must be closely controlled. While insufficient heating may fail to carry out the particular processing step involved, an excessive amount is equally undesirable in that it may seriously affect the overall quality of the processing operation. Also, since the sheet is often made of a combustible material, scorching and tearing may occur as a result of overheating thus completely ruining the reproduced copy and disrupting operation of the system. Such tendency to burning, moreover, constitutes an extremely hazardous situation.

Excessive heating may occur either as a result of improper control of the heating element or from slowing or stoppage of the driving rolls which move the sheet across the element. Overheating may occur even when the entire system is turned off. This happens as a result of the finite heat capacity of the heating element, whereby it requires a finite length of time to cool. During this time, heat radiation continues and may cause the effects described above.

Another cause of overheating occurs when the supply roll becomes exhausted while the system is still in operation. When this happens, there is nothing to hold the sheet material taut and away from the heating element and the unsupported free end of the sheet may swing dangerously close to the heating element as it passes by. Also in certain apparatus of this type the various elements within the device, which are normally shielded from the effects of the heating element by the sheet material, could become disrupted or damaged if the system remains in operation when the material is completely exhausted from the roll.

Consequently, it is an object of the present invention to provide an improved sheet roll heating device.

It is another object to provide a sheet roll heating device which does not overheat the sheet when the system becomes slowed or stopped for any reason.

A further object is to provide a sheet stock heating device wherein heating of the sheet terminates immediately upon cessation of the operation of the heating element independently of its cooling rate.

A still further object is to provide a sheet stock heating device which automatically turns off upon exhaustion of the roll containing the stock.

These and other objects are achieved in the following manner. A heating device is supported in such a manner that it may be directed alternately toward and away from the moving sheet. A resilient means such as a spring is situated to apply force against the heating device in a direction away from the sheet. An electrically activated latching means is also provided and operates to hold the heating element once it is directed toward the sheet. This is done by means of a switch which is closed by movement of the heating element toward the sheet and which operates when closed to place the electrical latching means in circuit with a voltage source. Further switching means are provided in series with the first switching means and the voltage source. These further switching means respond to the opening of a cover member as well as to the exhaustion of sheet material from the supply roll. Upon operation of either of these switches, the electrical latching means becomes disengaged and permits the resilient means immediately to move the heating element away from the sheet material. Coincidentally with this, the first switching means is allowed to open, thus turning off the heating element.

In the preferred embodiment, the heating element is mounted along one edge of a frame member. The frame member is pivotally supported along its opposite edge in a manner which allows the heating element to swing in an arc toward and away from the sheet material. A linkage system connects the frame to the armature of a latching solenoid which when activated maintains the frame in a position so that the heating element is directed toward the sheet. A coil spring is biased to force the armature out of the solenoid and the heating element away from the sheet whenever the solenoid is not activated. A normally open switch, connected in series between a voltage source and the solenoid, is closed by means of a cam on the frame whenever the frame is directed toward the sheet. The closing of this switch activates the solenoid which in turn holds the frame in place against the action of the spring. The drive roll motor, the heating element and the various other system elements are connected in parallel with the solenoid but in series with the normally opened switch. Consequently whenever the heating element is swung away from the sheet material, and the switch is allowed to open, the entire system is thereby turned off. An end of roll switch operates in the same manner to turn off the system prior to complete exhaustion of the supply roll. This is done by connecting a normally opened switch in series with the solenoid and the voltage source and by positioning the switch contacts against near one end of the supply roll so that they are held closed by the edge of the sheet material. When the end of the sheet material passes the switch contacts they are allowed to open, thus deactivating the solenoid and system as described above.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein.

Figure 1:
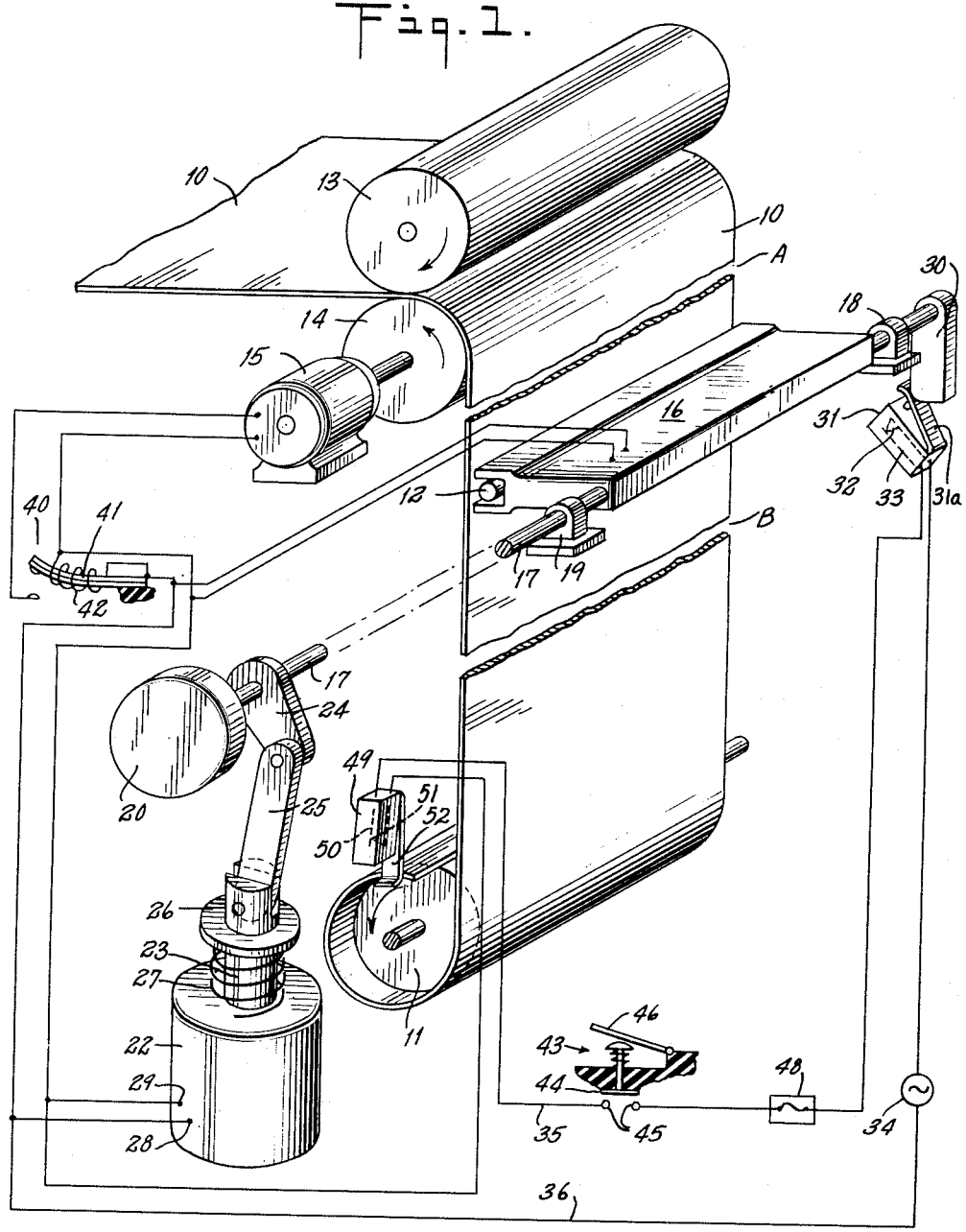
FIG. 1 is an illustration, partially in schematic, showing a preferred embodiment of the present invention.
Figure 2:
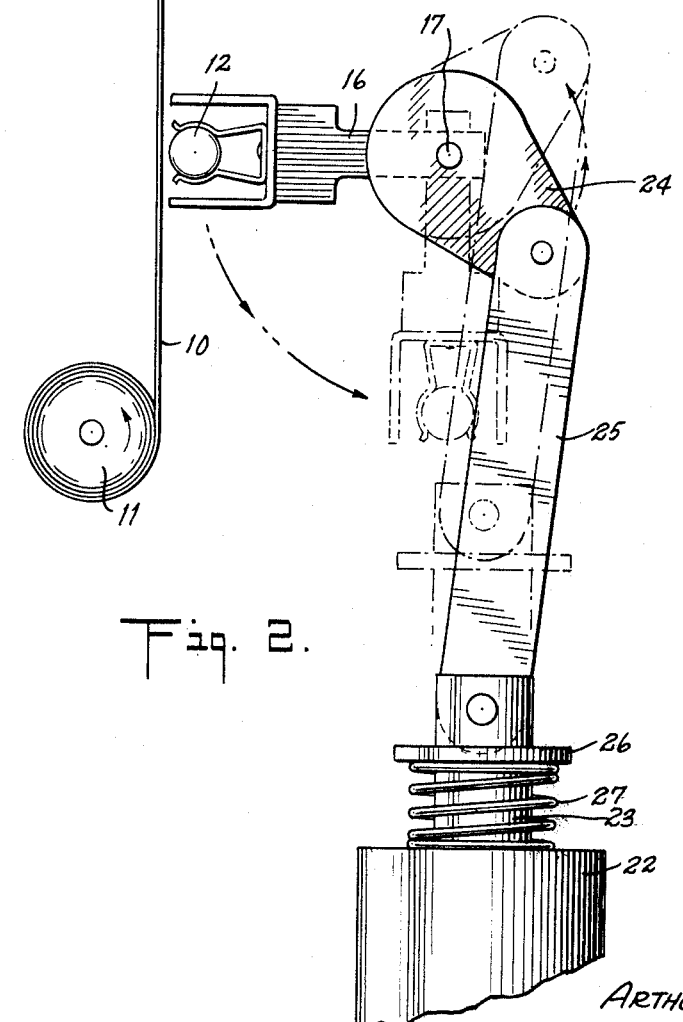
FIG. 2 is a further view of the embodiment shown in FIG. 1.

In the preferred embodiment shown in FIGS. 1 and 2, a web 10 of sheet material is continuously withdrawn from a sheet supply roll 11, and is guided close to a heating element 12. An idler roll 13 and a drive roll 14 are rotated by an electric motor 15 and operate to move the web 10 past the heating element.

The apparatus thus far described is similar to the arrangement used in many photocopying or photographic processing systems. In most of these systems, a number of steps may proceed and/or follow the heating step shown in the present embodiment. These other steps, however, form no part of the present invention and the sheet roll is shown to be broken at A and B to indicate their presence.

The heating element 12, which may be an electrical resistance device or an electrical lamp, is supported along an outer edge of a frame 16. This outer edge lies parallel to the plane of the web 10 so that heat radiated from the heating element 12 may be directed evenly along the sheet material comprising the web. The frame 16 is supported by means of a shaft 17 extending along its opposite edge. The shaft 17 in turn is pivotally mounted on a pair of fixed bearing members 18 and 19. A manual control knob 20 is provided at one end of the shaft 17 so that the outer edge of the frame 16 may be swung in an arc, thus directing the heating element 12 toward and away from the web 10. The alternate positions of the frame 16 and heating element 12 and their relation to the sheet 10, are shown respectively in the solid and dashed line arrangements of FIG. 2.

A solenoid 22 is provided with an axially movable armature 23 and is oriented with respect to the shaft 17 such that the armature moves along a line transverse to the rotational axis of the shaft 17. One end of the solenoid armature is connected to the shaft 17 through a linkage system comprising first and second link members designated respectively as 24 and 25. The first link member 24 is fixed at one end to the shaft 17 and rotates with the shaft. The second link member 25 is pivotally connected at both ends between the armature 23 and the other end of the first link 24. In this arrangement, as the armature 23 moves along its longitudinal axis, the linkage arrangement causes the shaft 17 to rotate, thus moving the frame 16 and the heating element 12 toward and away from the sheet material 10. A compression spring 27 is mounted between the frame of the solenoid 22 and a flange 26 which extends from the solenoid armature 23. This spring tends to force the armature outwardly of the solenoid 22, which in turn causes the frame 16 to pivot and the heating element 12 to swing away from the web 10 as shown in the dashed line arrangement of FIG. 2. When the solenoid 22 becomes excited by means of a voltage applied at a pair of input terminals 28 and 29, the armature 23 is held against the action of the spring member 27 thus holding frame 16 in the solid line position of FIG. 2.

A cam 30 is fixed to the shaft 17 and rotates with the shaft to control a microswitch 31. The microswitch 31 includes a pair of normally opened contacts 32 and 33 which are closed by the cam 30 pressing on a movable element 31a connected to the contact 32, when the shaft 17 is rotated to a position such that the heating elemen 12 is directed toward the sheet material 10. The first contact 32 of the microswitch 31 is connected to one terminal of a voltage source 34 which may be for example an alternating current generator. The second contact 33 of the microswitch and the remaining terminal of the generator 34 are connected respectively to a pair of power supply leads 35 and 36. When the contacts of the microswitch 31 are closed these leads supply electrical power to the various system components such as the solenoid 22, the heating element 12 and the drive motor 15. It is to be understood that any other components which operate in conjunction with the heating element may also be connected to receive power via the leads 35 and 36.

A cover switch 43 may be provided in series with the microswitch 31, and may be arranged to permit a closed circuit only when system is in proper condition for operation, as when its cover is closed. Thus as shown the switch would include normally opened contacts 44 and 45 arranged to be closed when a movable element, such as a cover, illustrated schematically at 46, is in place. Also provided in series circuit relationship with the microswitch 31 and the cover switch 43 is a current limiting circuit breaker or fuse 48, which operates to open the entire circuit and cut off power to all components in the event that a short circuit in the system produces an excess of current.

An end of roll switch 49 is arranged to have its contacts 50 and 51 connected in series circuit relationship with the above described switches so that when its contacts are allowed to open, it is likewise capable of interrupting the flow of electrical power to the remainder of the system. The end of roll switch has a movable element 52 on which the contact 50 is attached, and which presses against the edge of the sheet stock on the supply roll 11. The roll 11 has a length less than the width of the sheet stock so that during the last revolution of the roll, as the end of the sheet stock passes the movable element 52, the contact 50 springs away from the fixed contact 51 and opens the circuit.

It will be noted that all of the above described switches are connected in series circuit relationship with the power source 34 and prior to the various power receiving components such as the solenoid 22, the heating element 12 and the drive motor 15. While this is a preferred arrangement, it will be apparent that in order to carry out the principles of the present invention it is only necessary that the microswitch 31 precede all of the power receiving components and that only the solenoid 22 be preceded by all of the switches.

The power receiving components, as shown in FIG. 1, are connected in parallel circuit relationship across the power supply leads 35 and 36. When the overall circuit is closed power is supplied simultaneously to each of these components.

For certain applications it may be desirable to delay the commencement of operation of certain components for a certain duration as in the case where a warm up period is necessary. To permit this, a delay relay 40 may be provided in one of the power supply leads in series with those components whose operation is to be delayed. In the present embodiment a delay switch 40 is provided and is seen to comprise a bimetallic strip 41 which serves on the movable contact which opens and closes the power supply lead 36, as well as a heating coil 42 wound around the strip and connect across the power supply leads. When the system is turned on, current through the coil causes the bimetallic strip 41 to heat and bend until it closes the power supply lead 36 thus placing the motor 15, and any other components whose operation is to be delayed, in circuit with the power source 34. In the present case this permits the heating element 12 and other elements within the system, such as lamps and chemical solutions, to come up to operating temperature.

It is to be noted that while the motor 15, the heating element 12 and the other auxiliary equipment are connected in parallel circuit arrangement with the solenoid 22; each of these elements is connected in series circuit relationship with the microswitch 31. Thus any event which causes the frame 16 to swing the heating element 12 away from the web 10, will also cause all of the other electrical components to be turned off.

Operation of the system takes place in the following manner. Before the system is turned on, the heating element 12 and frame 16 are in the downward position (dashed line arrangement of FIG. 2), with the heating element 12 directed away from the web 10. In this position the cam 30 allows the contacts 32 and 33 of the microswitch 31 to remain in their normally open position, thus cutting off power to each of the electrical elements in the system. The system is put into operation by turning the manual control knob 20 which brings the frame 16 into a position such that the heating element 12 is directed at the web 10. The turning of the knob 20 also depresses the armature 23 into the solenoid 22 against the action of the compression spring 27. When the armature is fully depressed and when the heating element 12 becomes directed toward the web 10, the cam 30 reaches a position where it closes the contacts 32 and 33. This applies power to the various electrical elements including the heating element 12, and the time delay relay 40 leading to the drive motor 15. When the various elements have come up to operating temperature, the time delay relay 40 operates to place the drive motor 15 into circuit with the voltage source 34 to begin operation. The closing of the contacts of the microswitch 31 also causes the solenoid 22 to be activated. The armature 23 is then held by the solenoid against the action of the spring 27, thus maintaining the shaft 17 and its associated elements in their rotated position.

The system may be turned off by opening the normally closed contacts of any of the series connected switches 31, 43, 48 and 49. This cuts off power to all of the electrical elements including the solenoid 22. With the solenoid deactivated, the coil spring 27 is permitted to operate through the linkage members 24 and 25 to rotate the frame 16 and the shaft 17. This also causes the came 30 to move away from the microswitch 31, thus allowing its contacts to open and to maintain the system in an "off" condition regardless of any subsequent closing of the contacts of any of the other switches.

The system also may be turned off simply by manually turning the control knob 20 against the restraining force of the solenoid 22. By turning the control knob, the cam 30 is moved away from the normally opened contacts of the microswitch 31, and allows them to part, thus interrupting the electrical power supplied to all of the system elements including the solenoid itself. The system is then maintained in its "off" condition as described above.

It will be noted that the solenoid functions in the capacity of an electrical latching device. That is, it operates only after manual operation of the control knob brings the heating element into operating position and closes the contacts of the microswitch 31. Since the solenoid is not needed to pull the heating element into position but merely to maintain its position, the power requirements of the solenoid, and consequently its physical size may be quite small. The smaller size of the solenoid provides an additional advantage in that should the voltage supplied from the power source 34 become diminished for any reason, the solenoid would release and stop operation of the system; thereby preventing wasted power and materials caused by improper operating conditions.

Should the system accidentally be turned off, as by inadvertent opening of the cover or disconnecting of the power source, it does not go back into operation when the circuits are reclosed, but rather requires a positive manual effort at the control knob 20 in order to close the contacts of the microswitch 31. This inherent feature provides additional safety in that it insures that the system cannot be put into operation except by a positive and firm manual turning of the control knob.

Because of the finite heat capacity of the heating element 12, a certain amount of time is necessary before its temperature is reduced to a level where it ceases to heat the web 10. Therefore even when the system is turned off, the web would ordinarily tend to overheat unless it were maintained in motion during this time. According to the present invention however, turning off the system also cuts off power to the solenoid 22 and thus permits the compression spring 27 immediately to direct the heating element 12 away from the web 10. Even though the heating element remains at its high operating temperature for a considerable length of time, the web 10 will not be affected and may be stopped at the same instant the system is turned off without becoming damaged.

Figure 3:
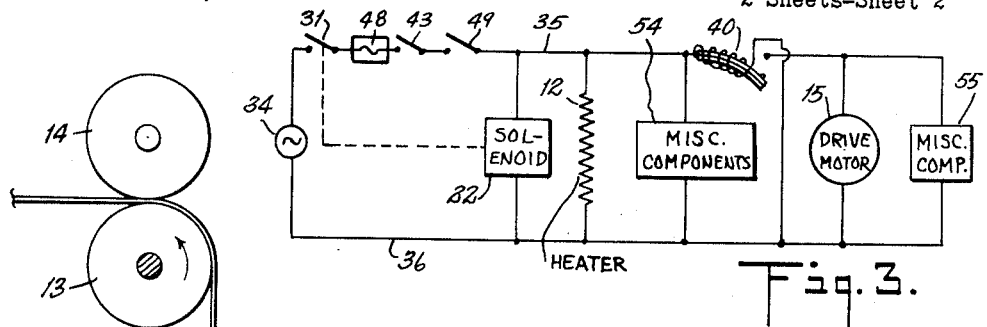
FIG. 3 is a circuit diagram illustrating the arrangement of the electrical connections in the apparatus of FIG. 1.

FIG. 3 is a circuit diagram of the electrical connections incorporated in the embodiment of FIGS. 1 and 2. As shown in FIG. 3, each of the power receiving components, namely the solenoid 22, the heater 12, the drive motor 15 and any other miscellaneous elements, designated generally at 54 and 55, are connected in parallel across the power supply leads 35 and 36. The various switches, such as the microswitch 31, the circuit breaker 48, the cover switch 43 and the end of roll switch 49 are connected in series with the power receiving components along the power supply lead 35. The number of power receiving components and switches may, of course, be increased or decreased, depending upon the particular application. Also they may be rearranged except that the solenoid 22 must be preceded by all switches which are to terminate operation of the system and the microswitch 31, which is controlled by the solenoid, must precede all components to so be turned off.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. In a sheet processing apparatus having electrically controlled components for moving and processing a sheet material, a heating control device comprising a heating element, constraining means operable to direct said heating element alternately toward and away from said sheet material at a given point, resilient restraining means biased to force said heating element away from said sheet material, an electromagnetic holding device including a movable element connected to move with said heating element and a fixed element located in magnetic holding positional relationship to said movable element when said heating element is directed toward said sheet material, and first and second electrical switching means, said first electrical switching means having normally opened contacts arranged to be closed upon the positioning of said heating device toward said sheet material, said second electrical switching means having switch contacts arranged to be closed during normal operation of said apparatus, the contacts of said first and second electrical switching means being together connected in series circuit relationship with said electromagnetic holding device and with said electrically controlled components for controlling the flow of electrical power thereto.

2. In a sheet processing apparatus having electrically controlled components for moving and processing a sheet material, a heating control device comprising, a frame mounted to pivot about an axis generally parallel to but displaced from said sheet, said frame carrying a heating element movable therewith between positions directing heat toward and away from said sheet, a spring arranged to bias said frame toward a position such that said heating element directs heat away from said sheet, a solenoid fixed relative to said axis, said solenoid having a movable armature connected to move with the pivoting of said frame said solenoid being capable, when energized, to maintain said armature in a position against the force of said spring, such that said frame and said heating element will direct heat toward said sheet, first switching means having normally opened switch contacts arranged and mounted to be closed by the moving of said frame and heating element to direct heat toward said sheet, second switching means having contacts which are closed during normal operation of said apparatus, the contacts of said first and second switching means being together connected in series circuit relationship with said solenoid and with said electrically controlled components for controlling the electrical energization thereof.

3. In a sheet processing apparatus, a sheet material supply roll, an electrical drive motor connected to drive rolls for withdrawing said sheet material from said drive rolls and moving it past a given point, a frame mounted to pivot about an axis parallel to said sheet material near said given point and having a heating element mounted along one edge thereof displaced from said axis whereby pivoting said frame to a first position permits heat to be directed toward said sheet material at said given point and pivoting said frame to a second position prevents the direction of heat toward said sheet, a solenoid mounted in fixed relationship to said axis, said solenoid having a reciprocally movable armature connected via a link to said frame whereby pivotal movement of said frame causes reciprocal movement of said armature, a spring arranged to force said armature in a direction corresponding to said second position of said frame, said solenoid, when electrically energized, being capable of holding said armature against the force of said spring in a position corresponding to said first position of said frame, a cam element mounted to rotate with said frame, a first switch having normally opened contacts positioned to be closed by said cam element when said frame is in said first position, a second switch having contacts which are closed during normal operation of said apparatus, said first and second switches being together connected in series circuit relationship with said solenoid and said electrical drive motor for controlling the electrical energization thereof.

4. The apparatus described in claim 3 wherein said second switch has normally opened contacts maintained in closed condition by the edge of said sheet material on said supply roll, whereby exhaustion of material from said supply roll, immediately and automatically produces stoppage of said drive motor and removal of heat from said sheet material.

References Cited by the Examiner
UNITED STATES PATENTS

| | | | |
|---|---|---|---|
| 2,639,364 | 5/53 | Doyle | 219—19.9 |
| 2,751,965 | 6/56 | Miller | 219—19.10 X |
| 3,053,962 | 9/62 | Cerasani et al. | 219—19.10 |

RICHARD M. WOOD, *Primary Examiner.*